July 19, 1966

J. O. CROUSE 3,261,225

CONTROL DEVICES

Filed April 22 1964

INVENTOR.
JOHN O. CROUSE
BY
J. H. Slough
Attorney

United States Patent Office 3,261,225
Patented July 19, 1966

3,261,225
CONTROL DEVICES
John O. Crouse, % Richland Auto Parts Company, Mansfield, Ohio
Filed Apr. 22, 1964, Ser. No. 361,862
2 Claims. (Cl. 74—501)

My invention relates to control devices referred to generally as "Bowden controllers" which are utilized where it is desired to communicate motion from a control to a more remotely disposed control point and relates further to improved housing means for said Bowden controllers. This is a continuation-in-part application of pending application Serial No. 639,275 filed February 11, 1957, and now abandoned.

An object of my invention is to provide the Bowden controller which may be longitudinally operated to adjust a control remotely disposed therefrom, said controller being housed in a flexible tubing, said tubing being adapted to be flexed in assembly or operation without "kinking" or collapse and hindering of the movement of the control cable, whereby said control cable can move freely throughout the length of the housing.

Another object of my invention is to provide a Bowden controller of the manual push-pull type-related having an improved housing therefor, which housing is subject to but a minimum amount of stretching in use under compression loads.

Still another object of my invention is to provide a Bowden controller housing having a lateral structural strength comparable to any known devices at considerable savings in cost.

Yet another object of my invention is to provide a Bowden controller freely reciprocable as desired within a housing having controlled bending characteristics which prevent pinching and kinking of the tubing and permit full restitution after bending.

Another object of my invention is to provide a Bowden controller which is protected against the effects of weather and temperature.

A further object of my invention is to provide a Bowden controller having high dieletric properties.

A still further object of my invention is to provide a Bowden controller which can be made in continuous lengths of 1500 feet or more than can be easily cut to any length.

Still other objects of my invention and the invention itself will be readily understood by a study of the appended description and the accompanying drawings.

The Bowden controller of my invention, as herein described and illustrated, is shown as it would be applied for remote control purposes in a small outboard marine craft. In such a craft, the steering is ordinarily accomplished by pivoting the outboard motor, and the throttle control housing and cable are subjected to repeated flexing in response to such pivotal movement. To maintain accurate throttle control, it is necessary that the control cable housing not be subject to stretching from use. It is also essential that the housing be capable of a reasonable amount of bending without acquiring a permanent bend or set and that it be impervious to adverse effects from oil, water, temperature and the like.

The new and novel Bowden controller of my invention is readily adaptable for various uses and the marine application as herein described and illustrated is submitted as an example only.

Figure 1:
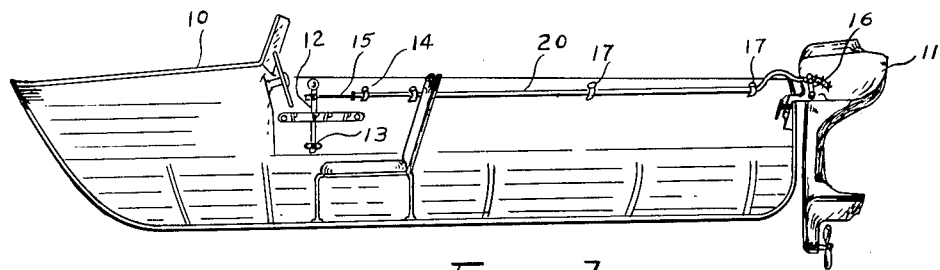
FIG. 1 is a longitudinal sectional view of a small boat of the type which is propelled by an outboard motor showing the Bowden controller of my invention installed therein.

Referring now to the drawings in all of which like parts are designated by like reference characters and particularly to FIG. 1, at 10 I show a small boat having an outboard motor 11 pivotally mounted at the stern thereof. Adjacent the forward end of the boat 10 is a control handle 12, said control handle being pivotally mounted at its lowermost end 13 in any suitable manner to the starboard gunwale 12 of said boat. A flexible control cable 15 is attached at one end thereof to the control handle 12 and at the other end thereof to a throttle lever 16 of the motor 11. The cable 15 extends rearwardly through flexible tubing 20 which is secured by any suitable means such as clips 17 to the starboard gunwale 14 of the boat 10. The cable 15 is attached to the handle 12 radially outwardly from the pivoted end 13 thereof whereby pivotal movement of said handle effects a reciprocating motion in said cable within the tubing 20. The reciprocating movement of the cable 15 actuates the throttle lever 16 of the motor 11 thereby controlling the speed of said motor.

Figure 6:
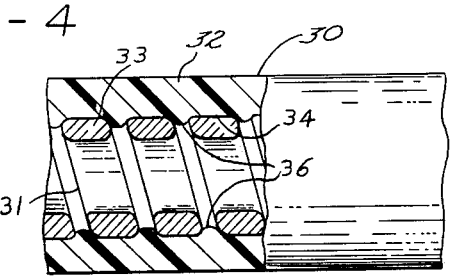
FIG. 6 is a modified view of the housing employed in the Bowden controller of my invention.

Referring now to FIGS. 2, 3, 4 and 5 of the drawings in which the details of the flexible tubing 20 are shown, at 21 I show a helically wound core preferably formed of hard metallic wire, said core being laterally encompassed throughout its longitudinal dimension by a plastic coating 22 integrally molded upon said core. The helically wound core 21 provides a multiplicity of contiguous convolutions 23 loosely threaded therethrough the control cable 15. The core 21 may be formed of wire of any suitable size, the core 21 in FIGS. 1 to 5 inclusive being shown circular and being shown in FIG. 6 as of cross-sectional rectangular form. The cable 15 is diametrically smaller than the inner diameter of the core 21 whereby said cable can move freely throughout the length of the said core, and in the form shown, said cable is preferably circular in cross-section.

The core wire is of substantially such large thickness relative to the interior of the helix that the diameter of the core wire is at least not substantially less than one-half of the dimension of the inside diameter of the core convolutions.

The plastic coating 22 may be molded upon the core 21 in any suitable manner such as by extrusion. In the molding process, the plastic of the coating 22 is formed around the core 21 while said plastic is in a molten state, as is well known during molding by the extrusion process, the fluent plastic material under fluid pressure, is forced deeply into the helical interstices between the outer half surface portions of each contiguous pair of convolutions of the helical core and adheres thereto, thus forming a helical ridge 26 wrich is interposed between successive of the convolutions 23 of said core 21, each coil convolution being interposed between successive of the ridge convolutions whereby the wire core 21 and the coating 22 are interlocked against relative longitudinal movements.

The core 21 is laterally resilient and capable of rapid restitution to its original shape after lateral bending. When the core 21 is integrally united and interlocked with the coating 22, said core cannot be stretched beyond its elastic limit as it is constrained throughout its entire length by the multiplicity of ridge convolutions 26.

The coating 22 may be manufactured of any suitable plastic material. A plastic which I have found to be well suited for my flexible tubing is a vinyl having a durometer reading of D–75 hardness. The plastic which I have chosen by way of example is highly resistant to stretching but is pliable and can be bent or flexed. This plastic is resilient but its force of restitution is substantially less than that of the core 21, and its resilient qualities are not adversely effected by temperature, weather, and the like, being not subject to becoming brittle when exposed to exceedingly low atmospheric temperatures over long periods.

It will be understood, therefore, that the flexible tubing 20 comprises two integrally and complementarily united elements, the core 21 and the coating 22, having different elastic qualities which, when combined and properly interlocked, provide a tubing which will not be subject to stretching in use so as to alter its effective length and which is strongly resistant to bending of any portion of its length on a short radius and which is highly resistant to structural damage. The diametrical size of the core wire combined with the fact that successive convolutions of the core wire are strongly resiliently held against separation combines with the non-stretching characteristics of the coating to provide said tubing with the desirable flexing characteristics; and the circular convolutions 23 provide great lateral resistance to pinching, kinking, or collapsing of said tubing.

Figure 2:
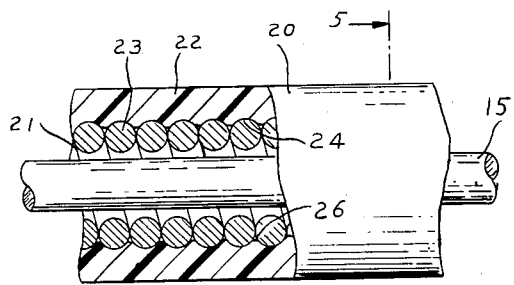
FIG. 2 is an enlarged detailed view of a portion of the Bowden controller of my invention shown partly in section.
Figure 3:
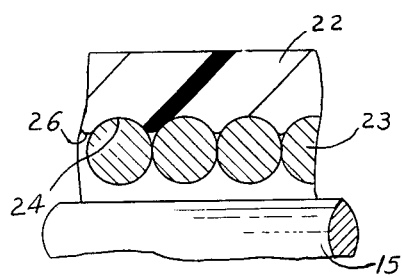
FIG. 3 is a further enlarged detailed view of a position of the Bowden controller of my invention as shown in FIG. 2.
Figure 4:
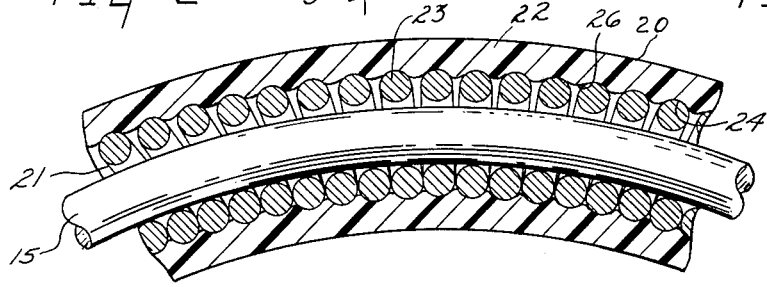
FIG. 4 is a sectional view similar to FIG. 2 showing a portion of the Bowden controller of my invention in a flexed position.
Figure 5:
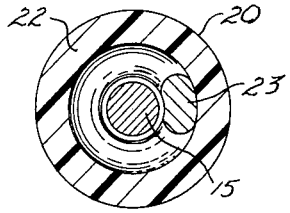
FIG. 5 is a transverse sectional view taken along the line 5—5 of FIG. 2.

Referring now to FIG. 2, it will be noted that when the tubing 20 is of considerable diameter and is bent on a shorter radius than is warranted by the diameter of the tubing that the convolutions 23 tend to separate slightly at the portions thereof which are disposed radially outwardly from the center of said bend, and the radially outwardly disposed portion of the coating 22 is subjected to substantial stress thereby pressing radially inwardly upon said convolutions with increased force. The radially inwardly disposed portion of the flexed coating 22 is compressed thereby causing the ridges 26 to be increasingly frictionally interlocked with the convolutions 23. Because of this frictional interlock between each of the convolutions 23 by the helical ridge 26 and the stressed outer portion of the coating 22, the separation of said convolutions at their radially outermost portions is controlled whereby tight bends or kinks and subsequent collapse of the tubing 20 is prevented. The controlled bending of the tubing 20 provides free reciprocating action of the cable 15 extending therethrough and insures against binding of said cable.

It will be understood from the foregoing description that the flexible tubing of my invention may be of variant diameters and the coating may be of any desired thickness whereas I consider it important that the relative dimensions set forth herein for the core wire thickness, and the inside diameter of the core helix be maintained. Departures from the details of my invention as it is herein described and illustrated may be made, such as changes in size and dimension, without, however, departing from the spirit of my invention and the scope of the appended claims.

What I claim is:

1. A Bowden controller comprising a laterally flexible and substantially nonextensible tubular housing, a Bowden control wire reciprocally disposed therein, said housing comprising a spring wire helix whose successive convolutions are resiliently maintained in lateral, contiguous, spring pressed engagement with each other, the interior of said helix providing a slideway on which the said control wire may be longitudinally adjusted, said helix having a substantially thick-walled coating of plastic material applied over all outwardly presented surfaces of said helix and coating, said coating being substantially non-erties generally corresponding to those possessed, to a substantial degree, by a vinyl having a durometer hardness rating of D–75, said coating being closely fitted within the exteriorly presented recesses between all pairs of successive helix convolutions, to longitudinally interlock said helix and coating, said coating being substantially non-stretchable, preventing longitudinal stretching of said helix and permitting free passage of the control wire therethrough.

2. A Bowden controller of the type substantially as set forth in claim 1, and being further characterized by the limitation that the diameter of the helix wire be not substantially less than that dimension which is one-half of the diameter of the recited slideway.

References Cited by the Examiner

UNITED STATES PATENTS

| | | | |
|---|---|---|---|
| 2,210,733 | 8/1940 | Schmid et al. | 74—501 |
| 2,550,576 | 4/1951 | Marshall | 74—501 |
| 2,774,382 | 12/1956 | Bentley | 74—501 |

MILTON KAUFMAN, *Primary Examiner.*

P. W. SULLIVAN, *Assistant Examiner.*